United States Patent
Zeng

(10) Patent No.: US 9,930,638 B2
(45) Date of Patent: Mar. 27, 2018

(54) METHOD, DEVICE AND SYSTEM FOR TRANSMITTING MULTICAST CONTROL CHANNEL CHANGE NOTIFICATION

(71) Applicant: Huawei Technologies Co., Ltd., Shenzhen, Guangdong (CN)

(72) Inventor: Qinghai Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 13/946,093

(22) Filed: Jul. 19, 2013

(65) Prior Publication Data

US 2013/0308516 A1    Nov. 21, 2013

Related U.S. Application Data

(63) Continuation of application No. PCT/CN2012/070112, filed on Jan. 6, 2012.

(30) Foreign Application Priority Data

Jan. 19, 2011  (CN) .......................... 2011 1 0022040

(51) Int. Cl.
*H04W 72/00* (2009.01)
*H04L 5/00* (2006.01)
(Continued)

(52) U.S. Cl.
CPC .......... *H04W 72/005* (2013.01); *H04L 5/0098* (2013.01); *H04W 4/06* (2013.01); *H04W 36/0005* (2013.01); *H04L 5/001* (2013.01)

(58) Field of Classification Search
CPC ................................................ H04W 72/005
See application file for complete search history.

(56) References Cited

U.S. PATENT DOCUMENTS

2006/0030342 A1* 2/2006 Hwang ................. H04N 21/21
                                                                    455/466
2011/0077006 A1* 3/2011 Hsu .............................. 455/436
(Continued)

FOREIGN PATENT DOCUMENTS

CN          101400028 A      4/2009
CN          101867876 A     10/2010
(Continued)

OTHER PUBLICATIONS

"Notification Mechanism for Multiple MCCHs," 3GPP TSG-RAN WG2 #67, Shenzhen, China, Document R2-094507, $3^{rd}$ Generation Partnership Project, Valbonne, France (Aug. 24-28, 2009).
(Continued)

*Primary Examiner* — Jason Mattis
(74) *Attorney, Agent, or Firm* — Leydig, Voit & Mayer, Ltd.

(57) ABSTRACT

A method, a device and a system for transmitting an multicast control channel change notification relate to the communication technology field, and solve the problem in the prior art that the MBMS service cannot be performed through a deactivated cell. A method for sending a multicast control channel change notification includes: acquiring relative identification information of the multicast control channel change notification when a non-effective cell of a terminal needs to send the MCCH change notification; and sending the MCCH change notification corresponding to the non-effective cell to the terminal in an effective cell; wherein, the effective cell is a cell that is assigned to the terminal and in an activation status, and the non-effective cell is a cell other than the effective cell.

12 Claims, 6 Drawing Sheets

Receiving the MCCH change notification on an effective cell of a terminal, where the MCCH change notification is an MCCH change notification corresponding to a non-effective cell of the terminal — 401

Performing a corresponding MBMS service according to the MCCH change notification — 402

(51) Int. Cl.
*H04W 4/06* (2009.01)
*H04W 36/00* (2009.01)

(56) References Cited

U.S. PATENT DOCUMENTS

| | | | |
|---|---|---|---|
| 2011/0085488 A1* | 4/2011 | Widegren | 370/312 |
| 2011/0216686 A1* | 9/2011 | Wu | 370/312 |
| 2011/0292854 A1* | 12/2011 | Terry | H04L 5/001 370/311 |
| 2012/0015657 A1* | 1/2012 | Comsa | H04W 36/0094 455/436 |
| 2012/0093051 A1 | 4/2012 | Xu | |

FOREIGN PATENT DOCUMENTS

| | | |
|---|---|---|
| CN | 101883323 A | 11/2010 |
| CN | 101931885 A | 12/2010 |
| CN | 102487480 A | 6/2012 |
| WO | WO 2009022823 A2 | 2/2009 |
| WO | WO 2011/002390 A1 | 1/2011 |

OTHER PUBLICATIONS

"On the Support for eMBMS in Carrier Aggregation," 3GPP TSG RAN WG1 Meeting #62bis, Xi'an, China, Document R1-105687, $3^{rd}$ Generation Partnership Project, Valbonne, France (Oct. 11-15, 2010).

"MBMS Status Report Counting," Change Request, 3GPP TSG-RAN WG3 Meeting #69bis, Xi'an, China, Document R3-102645, Current version 10.1.0, $3^{rd}$ Generation Partnership Project, Valbonne, France (Oct. 11-15, 2010).

International Search Report in corresponding International Patent Application No. PCT/CN2012/070112 (Apr. 12, 2012).

Written Opinion of the International Searching Authority in corresponding International Patent Application No. PCT/CN2012/070112 (Apr. 12, 2012).

"Remaining issues on carrier indicator field," 3GPP TSG-RAN WG1 #61, Montreal, Canada, R1-102891, $3^{rd}$ Generation Partnership Project, Valbonne, France (May 10-14, 2010).

* cited by examiner

METHOD, DEVICE AND SYSTEM FOR TRANSMITTING MULTICAST CONTROL CHANNEL CHANGE NOTIFICATION

CROSS-REFERENCE TO RELATED APPLICATIONS

This application is a continuation of International Patent Application No. PCT/CN2012/070112, filed on Jan. 6, 2012, which claims priority to Chinese Patent Application No. 201110022040.2, filed on Jan. 19, 2011, both of which are hereby incorporated by reference in their entireties.

FIELD OF TECHNOLOGY

The present disclosure relates to the field of wireless communication technology, and in particular relates to a method, a device and a system for transmitting a multicast control channel change notification.

BACKGROUND

Multimedia Broadcast/Multicast Service (Multimedia Broadcast/Multicast Service, MBMS) is a service that provides the same content to multiple users at the same time. On the network load, the MBMS service adopts broadcast or multicast mode for transmission so as to achieve network (including core network and access network) resource sharing and to provide the service for as many multimedia users of the same demand as possible with as less resource as possible.

If a secondary cell (Secondary Cell, SCell) is in a deactivation status, the terminal cannot monitor a physical downlink control channel (Physical Downlink Control Channel, PDCCH) on that SCell, thus it results that the terminal cannot receive a multicast control channel (Multicast Control Channel, MCCH) change notification of the deactivated SCell, and then cannot receive a new MBMS session on the deactivated SCell or perform counting feedback. For this issue, there is no corresponding solution at present.

SUMMARY

Embodiments of the present disclosure provide a method, a device and a system for transmitting a multicast control channel change notification so as to solve the problem in the prior art that the MBMS service cannot be performed on a deactivated cell.

In order to realize the above object, embodiments of the present disclosure employ the following technical solutions:

A method for sending a multicast control channel change notification, comprising:

acquiring relative identification information of the multicast control channel change notification when a non-effective cell of a terminal needs to send the MCCH change notification; and sending the MCCH change notification corresponding to the non-effective cell to the terminal on an effective cell;

wherein the effective cell is a cell that is assigned to the terminal and in an activation status, and the non-effective cell is a cell other than the effective cell.

A method for receiving a multicast control channel change notification, comprising:

receiving the MCCH change notification on an effective cell of a terminal, where the MCCH change notification corresponds to a non-effective cell of the terminal; and performing an MBMS service according to the MCCH change notification;

wherein, the effective cell is a cell that is assigned to the terminal and in an activation status, and the non-effective cell is a cell other than the effective cell.

An eNB (eNodeB), comprising:

an acquiring unit, configured to acquire relative identification information of a multicast control channel MCCH change notification when a non-effective cell of a terminal needs to send the MCCH change notification;

a sending unit, configured to send the MCCH change notification corresponding to the non-effective cell to the terminal on an effective cell;

wherein, the effective cell is a cell that is assigned to the terminal and in an activation status, and the non-effective cell is a cell other than the effective cell.

A terminal, comprising:

a first receiving unit, configured to receive a MCCH change notification on an effective cell of the terminal, where the MCCH change notification corresponds to a non-effective cell of the terminal; and a service unit, configured to perform corresponding an MBMS service according to the MCCH change notification;

wherein, the effective cell is a cell that is assigned to the terminal and in an activation status, and the non-effective cell is a cell other than the effective cell.

A communication system, comprising an eNB and a terminal, where the terminal supports an MBMS service; wherein, the eNB is configured to acquire relative identification information of a multicast control channel change notification when a non-effective cell of the terminal needs to send the MCCH change notification, and send the MCCH change notification corresponding to the non-effective cell to the terminal on the effective cell;

the terminal is configured to receive the MCCH change notification on the effective cell, and perform a corresponding MBMS service according to the MCCH change notification;

wherein, the effective cell is a cell that is assigned to the terminal and in an activation status, and the non-effective cell is a cell other than the effective cell.

The method, device and system for transmitting an multicast control channel change notification provided by embodiments of the present disclosure transmit an MCCH change notification corresponding to a non-effective cell of a terminal on an effective cell of the terminal, i.e., a cell that is assigned to the terminal and in an activation status, such that the terminal can receive the MCCH change notification of the non-effective cell without depending on a communication channel of the non-effective cell, thus can perform a corresponding MBMS service according to the MCCH change notification. The non-effective cell includes a cell that is assigned to the terminal but in a deactivation status and a cell that is not assigned to the terminal. The solutions provided by embodiments of the present disclosure can solve the problem in the prior art that the MBMS service cannot be performed on a deactivated cell.

BRIEF DESCRIPTION OF THE DRAWING(S)

To make embodiments of the present disclosure or the prior art more clear, the following will briefly introduce the accompanying drawings used in description of the embodiments. Apparently, the accompanying drawings show certain embodiments of the present disclosure, which are illustrative rather than exhaustive, and persons skilled in the art can derive other drawings from them without any creative work.

DETAILED DESCRIPTION

In embodiments of the present disclosure, a cell, which is assigned to a terminal and is in an activation status, is called an effective cell of the terminal, and other cells except the effective cell are called non-effective cells of the terminal; in addition, the non-effective cells and primary cell of the terminal are usually in a same eNB. The non-effective cells can include a cell that is assigned to the terminal but in a deactivation status and/or a cell that is not assigned to the terminal.

Figure 1:
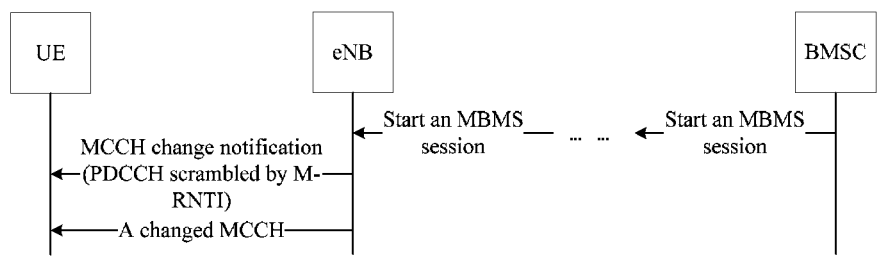
FIG. 1 is a schematic view of a signaling of a scheme for sending an MCCH control message and a change notification in the prior art according to an embodiment.

As shown in FIG. 1, in a LTE (Long Term Evolution, long term evolution) system, when a network side needs to start a new MBMS session, or the network side initiates a counting request to count up the number of terminals that need to receive one or more MBMS services, the eNB issues a MCCH change notification (change notification) to the terminal through a PDCCH control message scrambled by an MBMS-radio network temporary identifier M-RNTI (MBMS-Radio Network Temporary Identifier).

The carrier aggregation (Carrier Aggregation, CA) technology can aggregate multiple carriers into a wider spectrum, and simultaneously can aggregate some discontinuous spectrum fragments together. For a terminal that supports both LTE MBMS service and carrier aggregation, it not only can perform the MBMS service in a primary cell (Primary Cell, PCell) under the current eNB, but also has the capability to perform the MBMS service in other SCells other than the PCell.

In the prior art, some terminals have the capability to directly receive an MCCH change notification in the cells that are not assigned to the terminals, but, if the terminals monitor the MCCH channel directly in the non-assigned cells, the power consumption of the terminals is increased. In addition, it may cause changing of the central frequency point of RF chain of the terminal receivers, then affect normal data transmission, resulting in loss of data.

Embodiments of the present disclosure introduce an implementing scheme of transmission for an MCCH change notification. This scheme is not only applicable to the cells that are assigned to the terminal but are in the deactivation status, but also applicable to the cells that are not assigned to the terminal. The scheme provided by the embodiments of the present disclosure enables the terminal that has the capabilities of MBMS and carrier aggregation to effectively receive the MCCH change notification of the assigned and deactivated cells or the non-assigned cells under the condition of affecting normal data transmission as less as possible.

The following clearly and comprehensively describes the technical solutions of embodiments of the present disclosure with reference to accompanying drawings in the embodiments of the present disclosure. Embodiments described are only part of embodiments provided by the present disclosure, not all of them. Based on embodiments of the present disclosure, all of other embodiments obtained by those skilled in the art without creative work are within the protection scope of the present disclosure.

Embodiment 1

Figure 2:
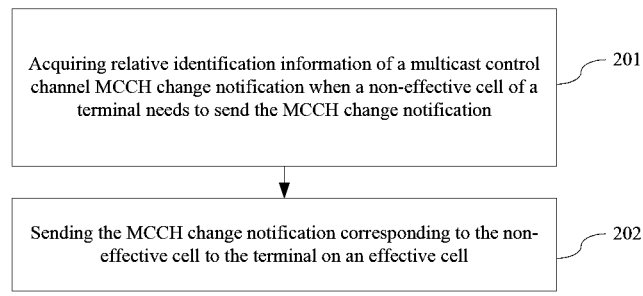
FIG. 2 is a flow diagram of a method for sending a multicast control channel change notification according to Embodiment 1 of the present disclosure.

As shown in FIG. 2, a method for sending a multicast control channel change notification according to an embodiment of the present disclosure includes:

201. Acquiring relative identification information of a multicast control channel MCCH change notification when a non-effective cell of a terminal needs to send the MCCH change notification.

The relative identification information can be one or a combination of a cell identification of the non-effective cell with the MCCH change notification, an area identification of a media multicast broadcast single frequency network (Multicast Broadcast Single Frequency Network, MBSFN) area with the MCCH change notification, an indication of an MCCH change reason and an MBMS service identification.

202. Sending the MCCH change notification corresponding to the non-effective cell to the terminal on an effective cell.

In the above steps, the effective cell is a cell that is assigned to the terminal and in an activation status, and the non-effective cell is another cell except the effective cell.

The executive body of the above steps can be an eNB.

Figure 3:
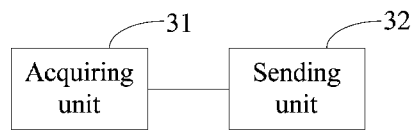
FIG. 3 is a schematic structural view of an eNB in Embodiment 1 of the present disclosure.

Corresponding to the method for sending the MCCH change notification, an embodiment of the present disclosure further provides an eNB for implementing above method. As shown in FIG. 3, the eNB includes:

an acquiring unit 31, configured to acquire relative identification information of a multicast control channel MCCH change notification when a non-effective cell of a terminal needs to send the MCCH change notification; and a sending unit 32, configured to send the MCCH change notification corresponding to the non-effective cell to the terminal in an effective cell;

wherein, the effective cell is a cell that is assigned to the terminal and in an activation status, and the non-effective cell is another cell except the effective cell.

The method for sending a multicast control channel change notification and the eNB provided by embodiment of the present disclosure transmit an MCCH change notification corresponding to a non-effective cell of a terminal on an effective cell of the terminal, such that the terminal can receive the MCCH change notification of the non-effective cell without depending on a communication channel of the non-effective cell, thus it can solve the problem in the prior art that the MBMS service cannot be performed on a deactivated cell.

Embodiment 2

Figure 4:
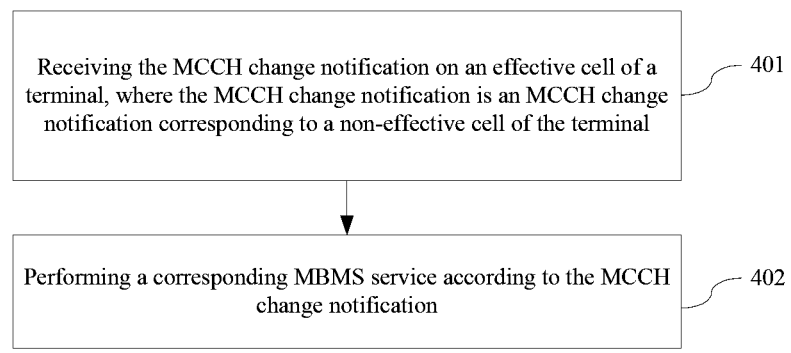
FIG. 4 is a flow diagram of a method for receiving a multicast control channel change notification according to Embodiment 2 of the present disclosure.

As shown in FIG. 4, a method for receiving a multicast control channel change notification according to an embodiment of the present disclosure includes:

401. Receiving the MCCH change notification on an effective cell of a terminal, where the MCCH change notification is an MCCH change notification corresponding to a non-effective cell of the terminal.

The MCCH change notification can carry relative identification information corresponding to the MCCH change notification. The relative identification information can be one or a combination of a cell identification of the non-effective cell with the MCCH change notification, an area identification of a media multicast broadcast single frequency network MBSFN area with the MCCH change notification, an indication of an MCCH change reason and an MBMS service identification.

For example, when the relative identification information is the area identification of the MBSFN area with the MCCH change notification, i.e., the area identification of the MBSFN area that contains the non-effective cell corresponding to the MCCH change notification, the terminal can perform a corresponding service or monitor an MCCH channel in a specific cell or in any one cell of the MBSFN area to acquire a changed MCCH control information after acquiring the area identification.

402. Performing a corresponding MBMS service according to the MCCH change notification.

In the present embodiment, the corresponding MBMS service can be a new MBMS session or a counting feedback.

In the above steps, the effective cell is a cell that is assigned to the terminal and in an activation status, and the non-effective cell is another cell except the effective cell.

The executive body of the above steps can be a terminal that supports the MBMS service. Furthermore, the executive body can be a terminal that supports the MBMS service and carrier aggregation simultaneously.

Figure 5:
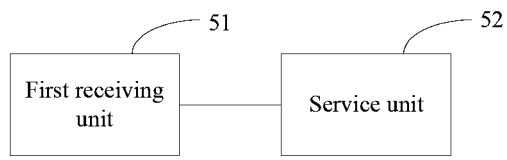
FIG. 5 is a schematic structural view of a terminal in Embodiment 2 of the present disclosure.

Corresponding to the above method for receiving a multicast control channel change notification, an embodiment of the present disclosure further provides a terminal for implementing the above method. As shown in FIG. 5, the terminal includes:

a first receiving unit 51, configured to receive an MCCH change notification on an effective cell of a terminal, where the MCCH change notification is an MCCH change notification corresponding to a non-effective cell of the terminal; and a service unit 52, configured to perform a corresponding MBMS service according to the MCCH change notification;

wherein the effective cell is a cell that is assigned to the terminal and in an activation status, and the non-effective cell is another cell except the effective cell.

The method for receiving a multicast control channel change notification and the terminal provided by embodiment of the present disclosure receive an MCCH change notification corresponding to a non-effective cell of a terminal on an effective cell of the terminal, such that the terminal can receive the MCCH change notification of the non-effective cell without depending on a communication channel of the non-effective cell, thus it can perform the corresponding MBMS service in the non-effective cell according to the MCCH change notification. Therefore, the solution according to the present embodiment can solve the problem in the prior art that the MBMS service cannot be performed on a deactivated cell.

Embodiment 3

A method for transmitting a multicast control channel change notification provided by an embodiment of the present disclosure is illustrated by an embodiment combining detailed operations of an eNB side and a terminal side at the same time.

In the present embodiment, since a network side is going to start a new MBMS session, the eNB carries a MCCH change notification in a dedicated signaling or a PDCCH control message scrambled by an M-RNTI, and the terminal receives the new MBMS session in the non-effective cell corresponding to the MCCH change notification.

Figure 6:
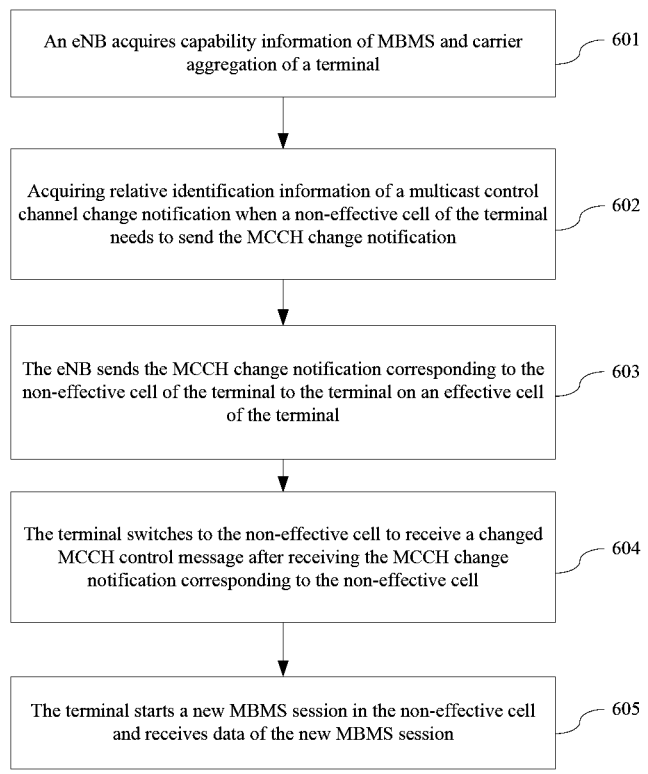
FIG. 6 is a flow diagram of a method for transmitting a multicast control channel change notification according to Embodiment 3 of the present disclosure.

As shown in FIG. 6, the method for transmitting the MCCH change notification provided by the embodiment of the present disclosure includes the following steps:

601. An eNB acquires capability information of MBMS and carrier aggregation of a terminal.

In step 601, when the terminal, which supports LTE MBMS service and carrier aggregation capability simultaneously, is attached to the network, it can report its capability of LTE MBMS and carrier aggregation initiatively; or, the eNB acquires the capability information of LTE MBMS and carrier aggregation of the terminal through querying a core network.

602. Acquiring relative identification information of a multicast control channel change notification when a non-effective cell of the terminal needs to send the MCCH change notification.

The relative identification information includes at least one of a cell identification of the non-effective cell with the MCCH change notification, an area identification of a media broadcast/multicast single frequency network MBSFN area with the MCCH change notification, an indication of an MCCH change reason and an MBMS service identification.

The indication of the MCCH change reason is configured to illustrate whether the network is going to start a new MBMS session or initiate a counting request. In the present embodiment, the MCCH change reason indicates to start a new MBMS session, and the MBMS service identification can be a service identification corresponding to the new MBMS session started by network side.

603. The eNB sends the MCCH change notification corresponding to the non-effective cell of the terminal to the terminal on an effective cell of the terminal.

If the non-effective cell of the terminal under the eNB needs to send the MCCH change notification due to a new MBMS session, and the terminal has the capability to receive MBMS service in this cell, the eNB can carry the MCCH change notification corresponding to the non-effective cell in a dedicated signaling or a PDCCH control message scrambled by an M-RNTI in the effective cell of the terminal.

Furthermore, in the present step, the MCCH change notification corresponding to the non-effective cell sent by the eNB on the effective cell includes the relative identification information of the MCCH change notification, which is configured to illustrate the non-effective cell corresponding to the MCCH change notification and/or type of the MBMS service change.

If the eNB adopts the dedicated signaling to carry the MCCH change notification, a media access control MAC control element (Control Element) or RRC (Radio Resource Control, radio resource control) signaling can be used. The dedicated signaling indicates the cell with the MCCH change notification through a physical cell identity (Physical Cell Identity, PCI) and/or a downlink central frequency of the cell and/or a cell index. The cell index is an index assigned when adding a new configured cell for distinguishing cells with different configurations in a same terminal, and the cell index is used for across carrier scheduling and carrier management at present.

If the eNB adopts the PDCCH control message scrambled by the M-RNTI to carry the MCCH change notification, the PDCCH control message includes indication information of change type, to indicate the cell that needs to perform MBMS service change, that is, to indicate whether the MCCH change notification is of the current cell or of other cells.

Since the primary cell is activated among the cells assigned to the terminal, the eNB usually sends the MCCH change notification through the dedicated signaling or the PDCCH control message scrambled by the M-RNTI of the primary cell. If multiple non-effective cells belong to a same MBSFN area, the MCCH change of the MBSFN area is notified to the terminal only once in the effective cell.

In step 603, if the relative identification information carried in the MCCH change notification sent by the eNB does not indicate an identification corresponding to the new MBMS session, the eNB needs to acquire to the identification of the new MBMS session in step 604, and performs step 605 only in the situation that the terminal is interested in the new MBMS session, or the procedure terminates.

In step 603, if the relative identification information carried in the MCCH change notification sent by the eNB definitely indicates the identification corresponding to the new MBMS session, at that time if the terminal is not interested in the new MBMS session, the procedure terminates. Furthermore, if relative information of logical channel, scheduling etc of the new MBMS session are also carried in the MCCH change notification, the eNB can skip step 604 and perform step 605 directly; or, the relative information of logical channel, scheduling etc of the new MBMS session needs to be acquired in step 604, then step 605 is performed.

In step 603, the eNB sends the MCCH change notification corresponding to the non-effective cell in the effective cell of the terminal, correspondingly, the terminal receives the MCCH change notification in its effective cell.

604. The terminal receives a changed MCCH control message in the non-effective cell after receiving the MCCH change notification corresponding to the non-effective cell.

605. The terminal starts a new MBMS session in the non-effective cell and receives data of the new MBMS session.

The terminal can acquire the relative information of logical channels, MBSFN sub-frame occupied by each logical channel and MBMS scheduling period, etc of the new MBMS service after receiving the changed MCCH control message.

The terminal acquires the MBMS channel scheduling information (MCH Scheduling Information, MSI) in each scheduling period and receives data of the MBMS service accordingly.

The method for transmitting a multicast control channel change notification provided by the embodiment of the present disclosure transmit an MCCH change notification corresponding to a non-effective cell of a terminal through a dedicated signaling or a PDCCH control message scrambled by an M-RNTI of an effective Cell of the terminal, such that the terminal can receive the MCCH change notification of the non-effective cell without depending on the communication channel of the non-effective cell, thus can perform a corresponding MBMS service in the non-effective cell according to the MCCH change notification.

Embodiment 4

A method for transmitting a multicast control channel change notification provided by an embodiment of the present disclosure is illustrated by another embodiment combining detailed operations of an eNB side and a terminal side at the same time.

In the present embodiment, since a network side is going to initiate a counting request, an eNB carries a MCCH change notification in a dedicated signaling or a PDCCH control message scrambled by an M-RNTI, and the terminal can directly perform counting feedback in the effective cell in that the MCCH change notification is received.

Figure 7:
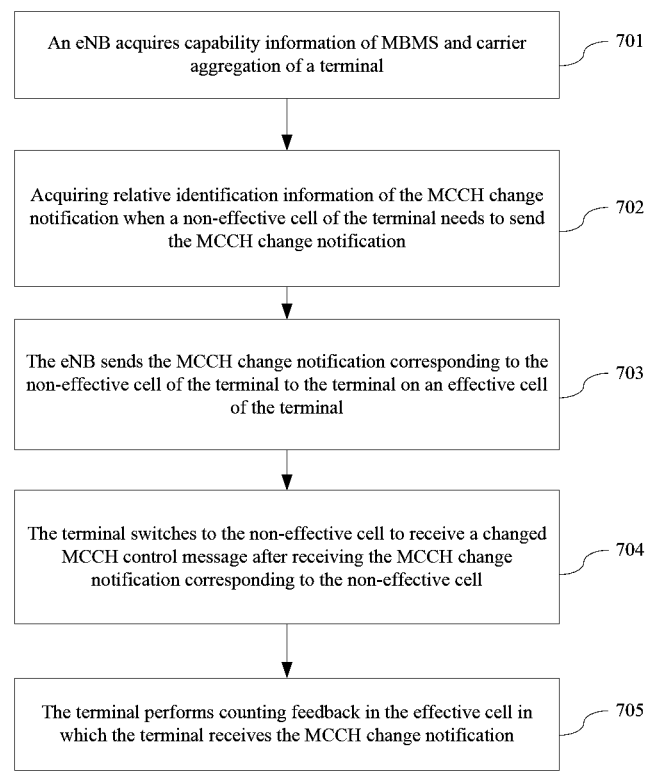
FIG. 7 is a flow diagram of a method for transmitting a multicast control channel change notification according to Embodiment 4 of the present disclosure.

As shown in FIG. 7, a method for transmitting an MCCH change notification provided by an embodiment of the present disclosure specifically includes the following steps:

701. An eNB acquires capability information of MBMS and carrier aggregation of a terminal.

In step 701, when the terminal, which supports LTE MBMS service and carrier aggregation capability simultaneously, is attached to the network, it can report its capability of LTE MBMS and carrier aggregation initiatively; or, the eNB acquires the capability information of LTE MBMS and carrier aggregation of the terminal through querying a core network.

702. Acquiring relative identification information of the MCCH change notification when a non-effective cell of the terminal needs to send the MCCH change notification.

The relative identification information includes at least one of a cell identification of the non-effective cell with the MCCH change notification, an area identification of a media broadcast/multicast single frequency network MBSFN area with the MCCH change notification, an indication of an MCCH change reason and an MBMS service identification.

The indication of the MCCH change reason is configured to illustrate whether the network is going to start a new MBMS session or initiate a counting request. In the present embodiment, the MCCH change reason indicates to initiate a counting request, and the MBMS service identification can be a service identification corresponding to the MBMS service that needs to perform counting.

703. The eNB sends the MCCH change notification corresponding to the non-effective cell of the terminal to the terminal on an effective cell of the terminal.

If the non-effective cell of the terminal needs to send the MCCH change notification due to initiating a counting request so as to count a number of terminals of one or more MBMS service, and the terminal has the capability to receive the MBMS service in this cell, the eNB can carry the MCCH change notification corresponding to the non-effective cell in a dedicated signaling or a PDCCH control message scrambled by an M-RNTI in the effective cell of the terminal.

Furthermore, in the present step, the MCCH change notification corresponding to the non-effective cell sent by the eNB on the effective cell includes the relative identification information of the MCCH change notification, which is configured to illustrate the non-effective cell corresponding to the MCCH change notification and/or type of the MBMS service change.

If the eNB adopts the dedicated signaling to carry the MCCH change notification, a MAC control element or RRC signaling can be used. The dedicated signaling indicates the cell with the MCCH change notification through a physical cell identity PCI and/or a downlink central frequency of the cell and/or a cell index.

If the eNB adopts the PDCCH control message scrambled by the M-RNTI to carry the MCCH change notification, the PDCCH control message includes indication information of change type, to indicate the cell that needs to change MBMS service, that is, to indicate whether the MCCH change notification is of the current cell or of other cells.

Since the primary cell is activated among the cells assigned to the terminal, the eNB usually sends the MCCH change notification through the dedicated signaling or the PDCCH control message scrambled by the M-RNTI of the primary cell. If multiple non-effective cells belong to a same MBSFN area, the MCCH change of the MBSFN area is notified to the terminal only once in the effective cell.

In step 703, if the relative identification information carried in the MCCH change notification sent by the eNB definitely indicates identifications corresponding to one or more MBMS services that need to perform counting, but the terminal is not interested in all the MBMS services that need to perform counting, the procedure terminates; or, skip step 704 and enter into step 705 directly.

In step 703, if the relative identification information carried in the MCCH change notification sent by the eNB does not definitely indicate an identification corresponding to the MBMS service that needs to perform counting, the terminal needs to acquire the identification corresponding to the MBMS service that needs to perform counting in step 704, then performed step 705.

In step 703, the eNB sends the MCCH change notification corresponding to the non-effective cell in the effective cell of the terminal, correspondingly, the terminal receives the MCCH change notification in its effective cell.

704. The terminal receives a changed MCCH control message in the non-effective cell after receiving the MCCH change notification corresponding to the non-effective cell.

705. The terminal performs counting feedback in an effective cell.

In step 705, the effective cell can be an effective cell that receives the MCCH change notification, and can also be other effective cell.

The terminal feeds back the interested MBMS service (one or more) that needs to perform counting by the RRC signaling in the effective cell, such as the primary cell. The RRC signaling indicates the MBSFN area information and an identification or bitmap of the interested MBMS service. The bitmap is based on a location of the MBMS service that needs to perform counting in the counting request, and if the terminal is interested in a service, a corresponding bit of the bitmap is set as "1".

The method for transmitting a multicast control channel change notification provided by the embodiment of the present disclosure transmits an MCCH change notification corresponding to a non-effective cell of a terminal through a dedicated signaling or a PDCCH control message scrambled by an M-RNTI of an effective cell of the terminal, such that the terminal can receive the MCCH change notification of the non-effective cell without depending on the communication channel of the non-effective cell, thus can perform the counting feedback in the effective cell that receives the MCCH change notification according to the MCCH change notification.

Embodiment 5

A method for transmitting a multicast control channel change notification provided by an embodiment of the present disclosure is illustrated by another embodiment combining detailed operations of an eNB side and a terminal side at the same time.

In the present embodiment, since a network side initiates a counting request, an eNB carries a MCCH change notification in a dedicated signaling or a PDCCH control message scrambled by an M-RNTI, and the terminal needs to switch to a non-effective cell corresponding to the MCCH change notification to perform counting feedback.

Figure 8:
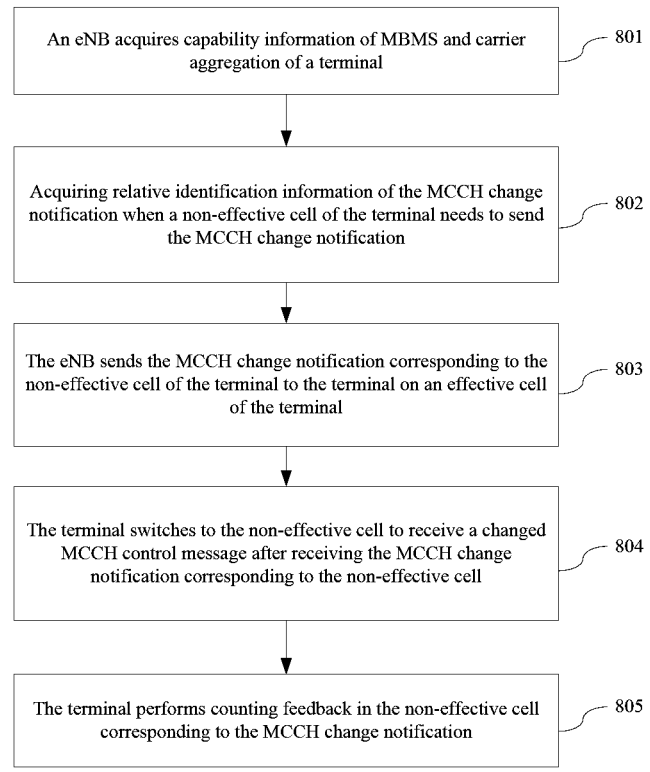
FIG. 8 is a flow diagram of a method for transmitting a multicast control channel change notification according to Embodiment 5 of the present disclosure.

The method for transmitting an MCCH change notification provided by the embodiment of the present disclosure specifically includes the following steps as shown in FIG. 8:

Steps 801-804 are the same of steps 701-704 in embodiment 4, and will not be repeated here.

805. The terminal performs counting feedback in the non-effective cell corresponding to the MCCH change notification.

In the non-effective cell corresponding to the MCCH change notification, the terminal feeds back the interested MBMS service that needs to perform counting by an RRC signaling. The RRC signaling indicates the MBSFN area information and an identification or bitmap of the interested MBMS service. The bitmap is based on a location of the MBMS service that needs to perform counting in the counting request, and if the terminal is interested in a service, a corresponding bit of the bitmap is set as "1". Furthermore, for the counting feedback, the terminal starts a random access procedure in the non-effective cell, and loads the RRC signaling in message 3 of the random access procedure. After the random access succeeds, the terminal does not establish an RRC connect with the non-effective cell.

The method for transmitting a multicast control channel change notification provided by the embodiment of the present disclosure transmits an MCCH change notification corresponding to a non-effective cell of a terminal through a dedicated signaling or a PDCCH control message scrambled by an M-RNTI of an effective cell of the terminal, such that the terminal can receive the MCCH change notification of the non-effective cell without depending on the communication channel of the non-effective cell, thus can perform the counting feedback in the non-effective cell corresponding to the MCCH change notification according to the MCCH change notification.

Embodiment 6

Corresponding to the above method embodiments, an embodiment of the present disclosure provides an eNB and a terminal for implementing above methods for transmitting a multicast control channel change notification.

Figure 9:
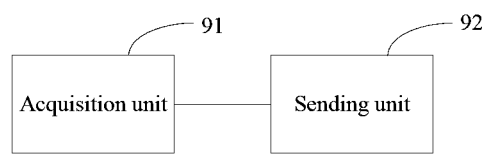
FIG. 9 is a schematic structural view of an eNB in Embodiment 6 of the present disclosure.

Wherein, an eNB provided by an embodiment of the present disclosure, as shown in FIG. 9, includes:

an acquisition unit 91, configured to acquire relative identification information of a multicast control channel change notification when a non-effective cell of a terminal needs to send the MCCH change notification; and a sending unit 92, configured to send the MCCH change notification corresponding to the non-effective cell to the terminal in an effective cell;

wherein the effective cell is a cell that is assigned to the terminal and in an activation status, and the non-effective cell is another cell except the effective cell.

Furthermore, the sending unit 92 is specifically configured to send the MCCH change notification corresponding to the non-effective cell to the terminal through a dedicated signaling or a physical downlink control channel PDCCH control message scrambled by an MBMS-radio network temporary identifier M-RNTI of the effective cell.

For the procedure of implementing the method for transmitting a multicast control channel change notification by using the above eNB, please refer to the description in the method embodiments, and will not be repeated here.

Using the above eNB to transmit an MCCH change notification corresponding to a non-effective cell of a terminal on an effective cell of the terminal, such that the terminal can receive the MCCH change notification of the non-effective cell without depending on the communication channel of the non-effective cell, thus it can solve the problem in the prior art that the MBMS service cannot be performed on a deactivated cell.

Figure 10:
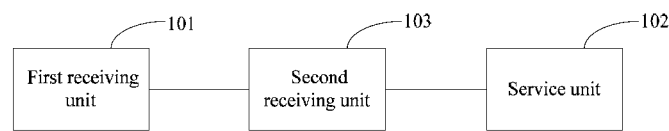
FIG. 10 is a schematic structural view of a terminal in Embodiment 6 of the present disclosure.

A terminal provided by an embodiment of the present disclosure, as shown in FIG. 10, comprising:

a first receiving unit 101, configured to receive an MCCH change notification on an effective cell of the terminal, where the MCCH change notification is an MCCH change notification corresponding to a non-effective cell of the terminal;

a service unit 102, configured to perform a corresponding MBMS service according to the MCCH change notification;

wherein the effective cell is a cell that is assigned to the terminal and in an activation status, and the non-effective cell is another cell except the effective cell.

Furthermore, the service unit 102 can include: a session module and/or a feedback module; wherein, the session module is configured to start a new MBMS session in the non-effective cell;

the feedback module is configured to perform counting feedback in the non-effective cell for an interested MBMS service; or, the feedback module is configured to perform counting feedback in the effective cell for an interested MBMS service.

In addition, the terminal in the present embodiment can further include a second receiving unit 103;

the second receiving unit 103 is configured to receive a changed MCCH control message in the non-effective cell; correspondingly, the service unit 102 is further configured to perform a corresponding MBMS service according to the received MCCH control message.

For the procedure of implementing the method for transmitting a multicast control channel change notification by using above terminal, please refer to the description in the method embodiments, and will not be repeated here.

The above terminal transmits an MCCH change notification corresponding to a non-effective Cell of the terminal on an effective cell of the terminal, such that the terminal can receive the MCCH change notification of the non-effective cell without depending on a communication channel of the non-effective cell, thus can perform a corresponding MBMS service in the non-effective cell according to the MCCH change notification. Therefore, the solution according to the present embodiment can solve the problem in the prior art that the MBMS service cannot be performed on a deactivated cell.

Embodiment 7

Figure 11:
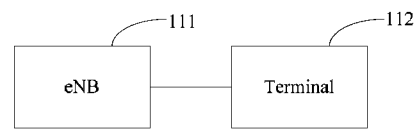
FIG. 11 is a schematic structural view of a communication system in Embodiment 7 of the present disclosure.

An embodiment of the present disclosure further provides a communication system. As shown in FIG. 11, the communication system includes an eNB 111 and a terminal 112, and the terminal 112 supports an MBMS service; where, the eNB 111 is configured to acquire relative identification information of a multicast control channel change notification when a non-effective cell of the terminal 112 needs to send the MCCH change notification, and send the MCCH change notification corresponding to the non-effective cell to the terminal 112 in an effective cell;

the terminal 112 is configured to receive the MCCH change notification in the effective cell, and perform corresponding an MBMS service according to the MCCH change notification;

where the effective cell is a cell that is assigned to the terminal and in an activation status, and the non-effective cell is another cell except the effective cell.

In the present embodiment, the eNB 111 sends the MCCH change notification corresponding to the non-effective cell to the terminal 112 through a dedicated signaling or a physical downlink control channel PDCCH control message scrambled by an MBMS-radio network temporary identifier M-RNTI of the effective cell.

Furthermore, the implementation of performing a corresponding MBMS service by the terminal according to the MCCH change notification includes:

the terminal 112 is specifically configured to start a new MBMS session in the non-effective cell or perform counting feedback for an interested MBMS service in the non-effective cell; or, the terminal 112 is specifically configured to perform counting feedback an the interested MBMS service in the effective cell.

For the procedure of implementing the method for transmitting a multicast control channel change notification by using the above communication system, please refer to the description in the method embodiments, and will not be repeated here.

The communication system provided by the embodiment of the present disclosure transmits an MCCH change notification corresponding to a non-effective cell of a terminal on a effective cell of the terminal, i.e., a cell that is assigned to the terminal and in an activation status, such that the terminal can receive the MCCH change notification of the non-effective cell without depending on a communication channel of the non-effective cell, thus can perform a corresponding MBMS service in the non-effective cell according to the MCCH change notification.

All of the embodiments above take the terminal, which supports the MBMS service and carrier aggregation simultaneously, as an example to introduce the MCCH change notification transmission solution provided by the embodiment of the present disclosure; but it should be noted that, the protection scope of the present disclosure is not limited to the situation that a terminal is the terminal that supports the MBMS service and carrier aggregation simultaneously. For example, for a terminal that does not have the capability of carrier aggregation, if the terminal needs to receive MBMS service of other cells, the terminal can send a request to the eNB, also the eNB sends a MCCH change notification to the terminal after acquiring that there is a MBMS session to be started or a counting request in the other cells.

Through the description of the preferred embodiments, it can be clearly understood by those of skill in the art that the present disclosure can be realized by virtue of software plus necessary hardware platforms, and certainly it can also be realized totally by virtue of hardware. Based on this understanding, the technical solution of the present disclosure contributing to the prior art may be entirely or partly embodied in the software product form. The computer software product is stored in a storage medium, such as a ROM/RAM, a floppy disk, or an optical disk, and includes several instructions adapted to enable a computer device (such as a personal computer, a server, or a network device) to execute the method according to each embodiment or certain parts of the embodiments of the present disclosure.

The above descriptions are merely preferred embodiments of the present disclosure, but not intended to limit the protection scope of the present disclosure. Any variations or replacement that can be easily derived by persons skilled in the art within the technical scope disclosed by the present disclosure shall fall within the protection scope of the present disclosure. Therefore, the protection scope of the present disclosure is subject to the appended claims.

What is claimed is:

1. A method for receiving a multicast control channel (MCCH) change notification, the method comprising:
   receiving the MCCH change notification on an effective cell of a terminal, wherein the MCCH change notification corresponds to a non-effective cell of the terminal; and
   performing a multimedia broadcast/multicast service (MBMS) service according to the MCCH change notification;
   wherein, the effective cell is a cell that is assigned to the terminal and in an activation status, and the non-effective cell is a cell that is assigned to the terminal and in a deactivation status; and
   wherein, the MCCH change notification carries relative identification information corresponding to the MCCH change notification, and the relative identification information comprises an area identification of a media multicast broadcast single frequency network (MBSFN) area with the non-effective cell, an indication of an MCCH change reason, and an MBMS service identification.

2. The method according to claim 1, wherein the performing the MBMS service according to the MCCH change notification comprises:
   starting a new MBMS session in the non-effective cell or performing counting feedback for an interested MBMS service in the non-effective cell.

3. The method according to claim 2, wherein, when performing the counting feedback for the interested MBMS service in the non-effective cell, the method further comprises:
   starting a random access procedure to the non-effective cell without establishing a radio resource control (RRC) connection.

4. The method according to claim 1, wherein the performing the MBMS service according to the MCCH change notification comprises:
   performing counting feedback for an interested MBMS service in the effective cell.

5. The method according to claim 1, wherein, after receiving the MCCH change notification on the effective cell of the terminal and before performing the MBMS service according to the MCCH change notification, the method further comprises:
   receiving a changed MCCH control message on the non-effective cell;
   wherein the performing the MBMS service according to the MCCH change notification includes performing the MBMS service according to the received MCCH control message.

6. A terminal, comprising:
   a receiver, configured to receive a multicast control channel (MCCH) change notification on an effective cell of the terminal, wherein the MCCH change notification corresponds to a non-effective cell of the terminal; and
   a processor, configured to perform a multimedia broadcast/multicast service (MBMS) service according to the MCCH change notification;
   wherein the effective cell is a cell that is assigned to the terminal and in an activation status, and the non-effective cell is a cell that is assigned to the terminal and in a deactivation status; and
   wherein, the MCCH change notification carries relative identification information corresponding to the MCCH change notification, and the relative identification information comprises an area identification of a media multicast broadcast single frequency network (MBSFN) area with the non-effective cell, an indication of an MCCH change reason, and an MBMS service identification.

7. The terminal according to claim 6, wherein the processor is further configured to:
   start a new MBMS session in the non-effective cell; and/or
   perform counting feedback for an interested MBMS service in the non-effective cell.

8. The terminal according to claim 6, wherein the processor is further configured to:
   perform counting feedback for an interested MBMS service in the effective cell.

9. The terminal according to claim 6, wherein the receiver is further configured to:
   receive a changed MCCH control message on the non-effective cell;
   wherein the processor is further configured to perform the MBMS service according to the received MCCH control message.

10. A communication system comprising:
    an eNB (eNodeB); and
    a terminal that supports a multimedia broadcast/multicast service (MBMS) service;
    wherein the eNB is configured to acquire relative identification information of a multicast control channel (MCCH) change notification when a non-effective cell of the terminal needs to send the MCCH change notification, and send the MCCH change notification corresponding to the non-effective cell to the terminal on an effective cell;
    wherein the terminal is configured to receive the MCCH change notification on the effective cell, and perform an MBMS service according to the MCCH change notification; and
    wherein the effective cell is a cell that is assigned to the terminal and in an activation status, and the non-effective cell is a cell that is assigned to the terminal and in a deactivation status; and
    wherein, the MCCH change notification carries relative identification information corresponding to the MCCH change notification, and the relative identification information comprises an area identification of a media multicast broadcast single frequency network (MBSFN) area with the non-effective cell, an indication of an MCCH change reason, and an MBMS service identification.

11. The communication system according to claim 10, wherein the eNB sends the MCCH change notification corresponding to the non-effective cell to the terminal through a dedicated signaling or a physical downlink control channel (PDCCH) control message scrambled by an MBMS-radio network temporary identifier of the effective cell.

12. The communication system according to claim 10, wherein when performing an MBMS service according to the MCCH change notification by the terminal:
- the terminal is configured to start a new MBMS session in the non-effective cell or perform counting feedback for an interested MBMS service in the non-effective cell; or,
- the terminal is configured to perform counting feedback for an interested MBMS service in the effective cell.

* * * * *